Patented Sept. 17, 1935

2,014,782

UNITED STATES PATENT OFFICE 2,014,782

PREPARATION OF INORGANIC ACID ESTERS OF HIGHER GLYCOLS

Walther Schrauth, Berlin-Dahlem, and Richard Hueter, Rosslau in Anhalt, Germany, assignors, by mesne assignments, to "Unichem" Chemikalien Handels A.-G., Zurich, Switzerland, a corporation of Switzerland No Drawing. Application May 3, 1932, Serial No. 609,035. In Germany May 4, 1931

10 Claims. (Cl. 260—99.12)

Of late, it was repeatedly proposed to produce agents employed in the manufacture of textiles by sulphonating primary alcohols of high molecular weight, the constitution of which corresponds to normal fatty acids.

These known products could be introduced foremostly only for use in textile improving processes, as they are either difficultly soluble—especially alkyl sulphuric acid compounds of high molecular weight—or may only be obtained in adequate purity by processes involving considerable technical difficulties. In addition, their resisting powers against the effects of acids, furthermore the solubility of the lime and magnesia salts are mostly not great enough for all purposes of application.

It was now found that the acid esters of alkylene glycols of high molecular weight and polybasic acids, containing one or more acid groups, as well as their salts do not possess the aforestated shortcomings, and in addition represent agents for wetting, levelling, dispersing, and washing with surprisingly advantageous effects. Furthermore, they give textile goods a soft, flexible feel, and owing to their lime and magnesia salts being easily soluble, they may be used without hesitation in hard water, and in consequence of their stability against acids also in acid washing liquors and the like. Clear aqueous solutions are obtained with solvents of alcoholic nature, hydrogenated phenols, as well as chlorinated hydrocarbons, and homogeneous dispersions are obtained with other substances insoluble in water, fats, waxes, fatty acids and the like. They are also not salted out by concentrated salt solutions.

Alkylene glycols, as described above, are aqueous additive compounds of the unsaturated alcohols of high molecular weight which are easily obtained from sperm oil or Doeglin fish-oil or the liquid constituents of spermaceti (sperm oil). By way of example, about 30-35% are produced from sperm oil, consisting essentially of octadecen-(9)-ol-(1), some hexadecen-(8)-ol-(1) and inconsiderable quantities of the corresponding unsaturated compound with 20 carbon atoms. These substances are saturated by treatment with acids, in particular sulphuric acid, and, under certain circumstances, subsequent hydrolysis with diluted acids, alkalines and the like. The saturated substances belong to the group of alkylene glycols, and contain one terminal hydroxyl group and a further one at one of the central carbon atoms. Any quantities of these polyvalent alcohols may be easily produced from raw materials, for which only limited technical use existed till now. The conversion of alcohols into esters of polybasic acids is performed in the known manner, for instance by treating with sulphuric acid or other sulphonating agents. Acid phosphoric acid esters, esters of polybasic organic acids, especially of sulfocarboxylic acids and the like act similar to derivatives of sulphuric acid. But sulphuric acid esters are most easily accessible.

Example 1

If fatty alcohols of sperm-oil (iodine number of 83–90) principally hexadecenyl- and octadecenyl- alcohols as separated from the solid ingredients are reacted with sulfuric acid at a temperature below 5° C., subsequently saponified by boiling water, separated from the water and separated from any remaining solid constituents and then reacted with chloro-sulfonic acid, a product is obtained which is especially suitable for treatment of raw greasy wool. The reactions so far as they can be represented by formula are believed to occur substantially as follows:

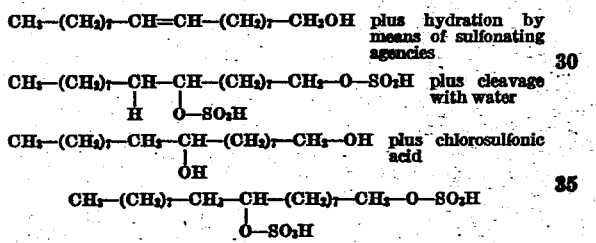

Whether or not the formulas shown accurately represent the reactions the products resulting are particularly effective for the treatment of fibrous material. After neutralization with soda lye the product is dissolved in 500–1000 times the quantity of water. If greasy wool is treated for 15 minutes at 40–50° with this solution clean, degreased wool is obtained which is ready for manufacturing.

Example 2

In the same manner as described in Example 1 a product may be obtained which is suitable for washing linen and the like in sea-water or for laundries only having extremely hard water at their disposal. It is expedient to adjust the neutralized sulphonate to the consistency of soft soap by adding water. The application is the same as of common soap, but all losses of material due to precipitation of lime and magnesia are eliminated, besides damages to the linen on account of deposits of these products on the fibres are avoided. The sulphonate may also be employed in combination with common additions to soap, as well as mixed with soap itself. In the latter case, too, the stability against substances which harden the water is maintained to a high degree, as the sulphonate disperses deposits of lime-soap.

Example 3

A levelling agent, of which an addition of 0.2% to acid dyeing baths affords levelling effects particularly with hanks of wool and textiles and favorably influences the feel of the goods, is obtained by sulphonating hydrated, unsaturated, fatty alcohols of sperm-oil, which are free of solid components. Such addition agents resisting the 0.5% contents of free sulphuric acid in the dyeing bath are particularly obtained if the raw hydration—mixture is freed by fractional distillation of the first runnings boiling under 220° at 18 mm. mercury pressure and sulphonating with a quantity of chlorosulphonic acid corresponding to the acetyl saponification number. The product, finished in the usual manner, is concentrated by vaporization to the consistency of soft soap.

We claim:

1. The method of producing alkyl sulfates which comprises producing an alkyl glycol mixture from sperm oil and reacting the same with chlorosulfonic acid in the proportion necessary to replace both hydroxyl groups as indicated by the acetyl number.

2. The method of producing alkyl sulfates which comprises producing an alkyl glycol mixture from sperm oil, said glycols containing essentially 16 to 18 carbon atoms in the molecule and reacting the same with chlorosulfonic acid in the proportion necessary to replace both hydroxyl groups as indicated by the acetyl number.

3. The method of producing alkyl sulphates which comprises producing an alkyl glycol mixture from sperm oil, said glycols containing essentially 16 to 18 carbon atoms in the molecule, reacting the same with chloro-sulfonic acid in the proportion necessary to replace both hydroxyl groups as indicated by the acetyl number, and neutralizing with an alkali metal the acid esters so formed.

4. The method of producing alkyl sulfates which comprises reacting unsaturated alcohols derived from sperm oil with concentrated sulfuric acid at temperatures below 5° C. to produce sulfuric acid esters subjecting the reaction products to the action of boiling water to produce dihydroxy alcohols from said esters removing the water and reacting the alcohols with chlorosulfonic acid to produce sulfuric acid esters.

5. The method of producing alkyl sulfates which comprises reacting unsaturated alcohols derived from sperm oil with concentrated sulfuric acid at temperatures below 5° C. to produce sulfuric acid esters subjecting the reaction products to the action of boiling water to produce dihydroxy alcohols from said esters, removing the water, separating by fractional distillation the fraction boiling below 220° C. at 18 mm. mercury pressure and reacting the remainder with a quantity of chlorosulfonic acid necessary to replace the hydroxyl group as indicated by the acetyl number.

6. The method of producing substances suitable a wetting, levelling, dispersing or cleaning agents which comprises reacting a polybasic acid selected from the group consisting of sulfuric acid, chlorosulfonic acid, phosphoric acids and sulforcarboxylic acid with an alkyl glycol of higher molecular weight obtained from sperm oil, thereby forming acid esters.

7. The method of producing substances suitable as wetting, levelling, dispersing or cleaning agents which comprises esterifying a higher molecular dihydroxy alcohol of primary and secondary structure with a phosphoric acid.

8. The method of producing substances suitable as wetting, levelling, dispersing or cleaning agents which comprises esterifying a higher molecular dihydroxy alcohol obtained from sperm oil with a phosphoric acid.

9. The method of producing substances suitable as wetting, levelling, dispersing or cleaning agents which comprises producing alkyl glycols from sperm oil, esterifying said glycols with a sulfonating agent, and neutralizing to form water soluble salts.

10. The method of producing substances suitable as wetting, levelling, dispersing or cleaning agents which comprises treating unsaturated alcohols obtained from sperm oil with sulfuric acid thereby saturating the alcohols, hydrolyzing to produce alkyl glycols, sulfating said glycols to produce sulfuric acid esters thereof.

WALTHER SCHRAUTH.
RICHARD HUETER.